(12) United States Patent
Suzuki et al.

(10) Patent No.: US 11,218,615 B2
(45) Date of Patent: Jan. 4, 2022

(54) IMAGE FORMING APPARATUS AND CONTROL METHOD

(71) Applicant: TOSHIBA TEC KABUSHIKI KAISHA, Tokyo (JP)

(72) Inventors: Takaaki Suzuki, Tagata Shizuoka (JP); Noboru Ogino, Sunto Shizuoka (JP); Makoto Harigae, Shinagawa Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/924,978

(22) Filed: Jul. 9, 2020

(65) Prior Publication Data

US 2021/0092249 A1 Mar. 25, 2021

(30) Foreign Application Priority Data

Sep. 25, 2019 (JP) .............................. JP2019-174693

(51) Int. Cl.
*H04N 1/00* (2006.01)
*G06F 1/3209* (2019.01)

(52) U.S. Cl.
CPC ....... *H04N 1/00896* (2013.01); *G06F 1/3209* (2013.01); *H04N 1/00891* (2013.01)

(58) Field of Classification Search
None
See application file for complete search history.

(56) References Cited

U.S. PATENT DOCUMENTS

| 9,384,432 | B2* | 7/2016 | Hagiwara | ............ G06K 15/408 |
| 9,442,445 | B2 | 9/2016 | Hashimoto | |
| 9,813,576 | B2* | 11/2017 | Niimura | ................. G06F 1/324 |
| 2002/0006296 | A1 | 1/2002 | Omoto et al. | |
| 2004/0151513 | A1 | 8/2004 | Nomura | |

(Continued)

FOREIGN PATENT DOCUMENTS

| EP | 2503396 A1 | 9/2012 |
| EP | 2509030 A2 | 10/2012 |

(Continued)

OTHER PUBLICATIONS

Extended European Search Report dated Feb. 9, 2021, mailed in counterpart European Application No. 20192205.1, 8 pages.

*Primary Examiner* — Dov Popovici
(74) *Attorney, Agent, or Firm* — Kim & Stewart LLP

(57) ABSTRACT

An image forming apparatus communicates with another device and includes a processor that controls the communication. A control unit controls the apparatus to operate in one of at least a first power saving state, a second power saving state, and a normal state. In the first power saving state, the apparatus is controlled so that an image forming unit, an image reading unit, and the control unit are not activated, and a communication device is activated. In the second power saving state, the apparatus is controlled so that at least one of the image forming unit and the image reading unit are not activated, and the communication device and the control unit are activated. In the normal state, the apparatus is controlled so that at least the image forming unit, the image reading unit, the communication device, and the control unit are activated.

17 Claims, 7 Drawing Sheets

(56) References Cited

U.S. PATENT DOCUMENTS

| | | | |
|---|---|---|---|
| 2012/0257247 A1 | 10/2012 | Yamasaki | |
| 2014/0146345 A1* | 5/2014 | Fujisawa | G06K 15/4055 358/1.14 |
| 2015/0173020 A1 | 6/2015 | Mikami | |

FOREIGN PATENT DOCUMENTS

| | | |
|---|---|---|
| JP | 2005250326 A | 9/2005 |
| JP | 2013129130 A | 7/2013 |

\* cited by examiner

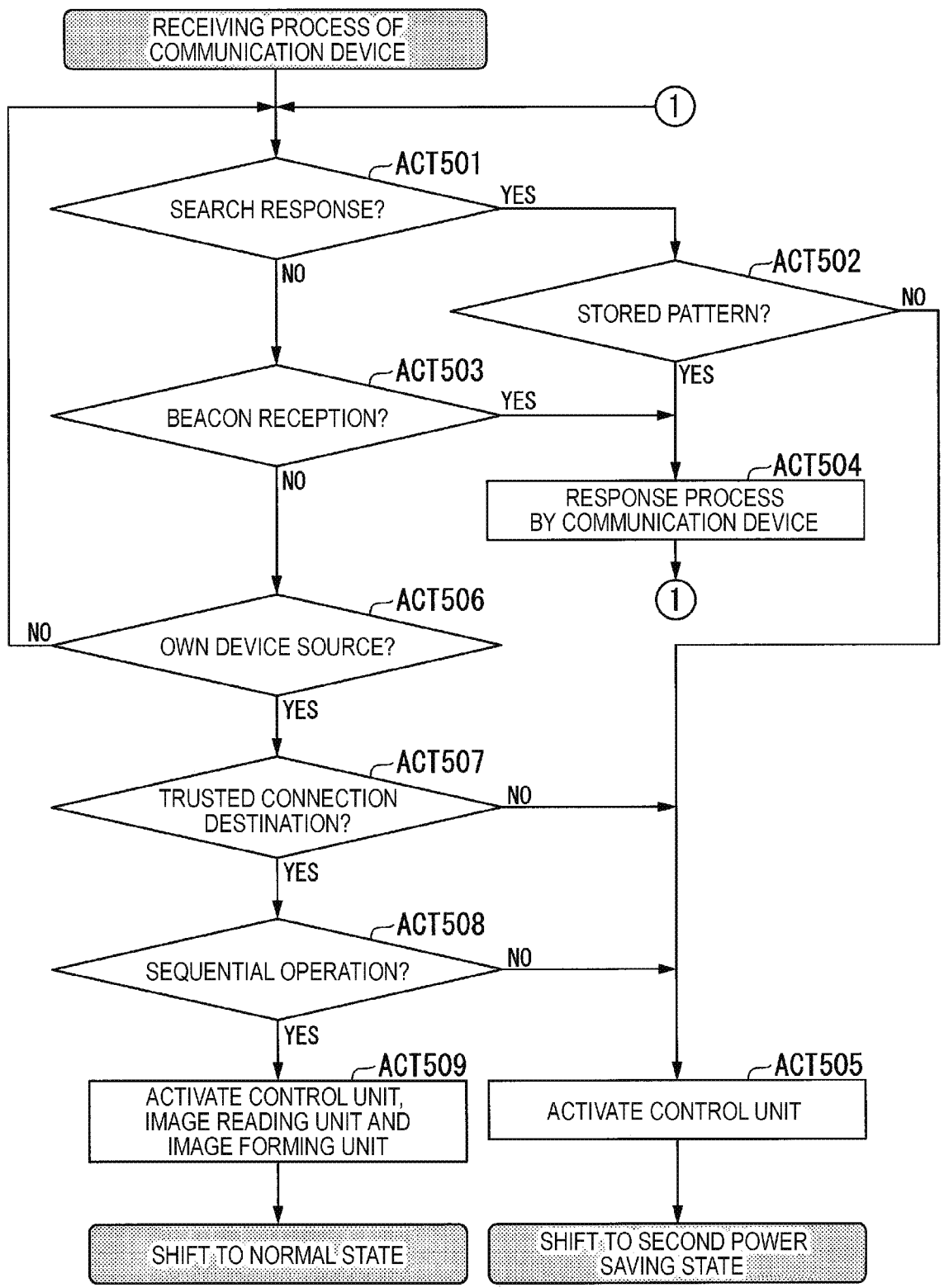

IMAGE FORMING APPARATUS AND CONTROL METHOD

CROSS-REFERENCE TO RELATED APPLICATION

This application is based upon and claims the benefit of priority from Japanese Patent Application No. 2019-174693, filed on Sep. 25, 2019, the entire contents of which are incorporated herein by reference.

FIELD

Embodiments described herein relate generally to an image forming apparatus and a control method thereof.

BACKGROUND

The reduction of power consumption is a major issue for image forming apparatuses. Therefore, various techniques for reducing power consumption in image forming apparatuses have been proposed. However, there is still a demand for reducing power consumption to a greater extent.

DESCRIPTION OF THE DRAWINGS

FIG. 8 is a diagram illustrating aspects of processing of a communication device.

DETAILED DESCRIPTION

Embodiments provide an image forming apparatus and a control method that can reduce power consumption in an image forming apparatus.

In general, according to one embodiment, an image forming apparatus includes an image forming unit, an image reading unit, a communication device, and a controller. The image forming unit forms an image on a sheet using a developing material. The image reading unit reads an image on a sheet. The communication device communicates with another device and includes a processor that controls the communication with the other device. The control unit controls the image forming apparatus to operate in a first power saving state, a second power saving state, and a normal state. In the first power saving state, the image forming apparatus is controlled so that the image forming unit, the image reading unit, and the control unit are not activated and the communication device is activated. In the second power saving state, the image forming apparatus is controlled so that at least one of the image forming unit and the image reading unit are not activated and the communication device and the control unit are activated. In the normal state, the image forming apparatus is controlled so that at least the image forming unit, the image reading unit, the communication device, and the control unit are activated.

Figure 1:
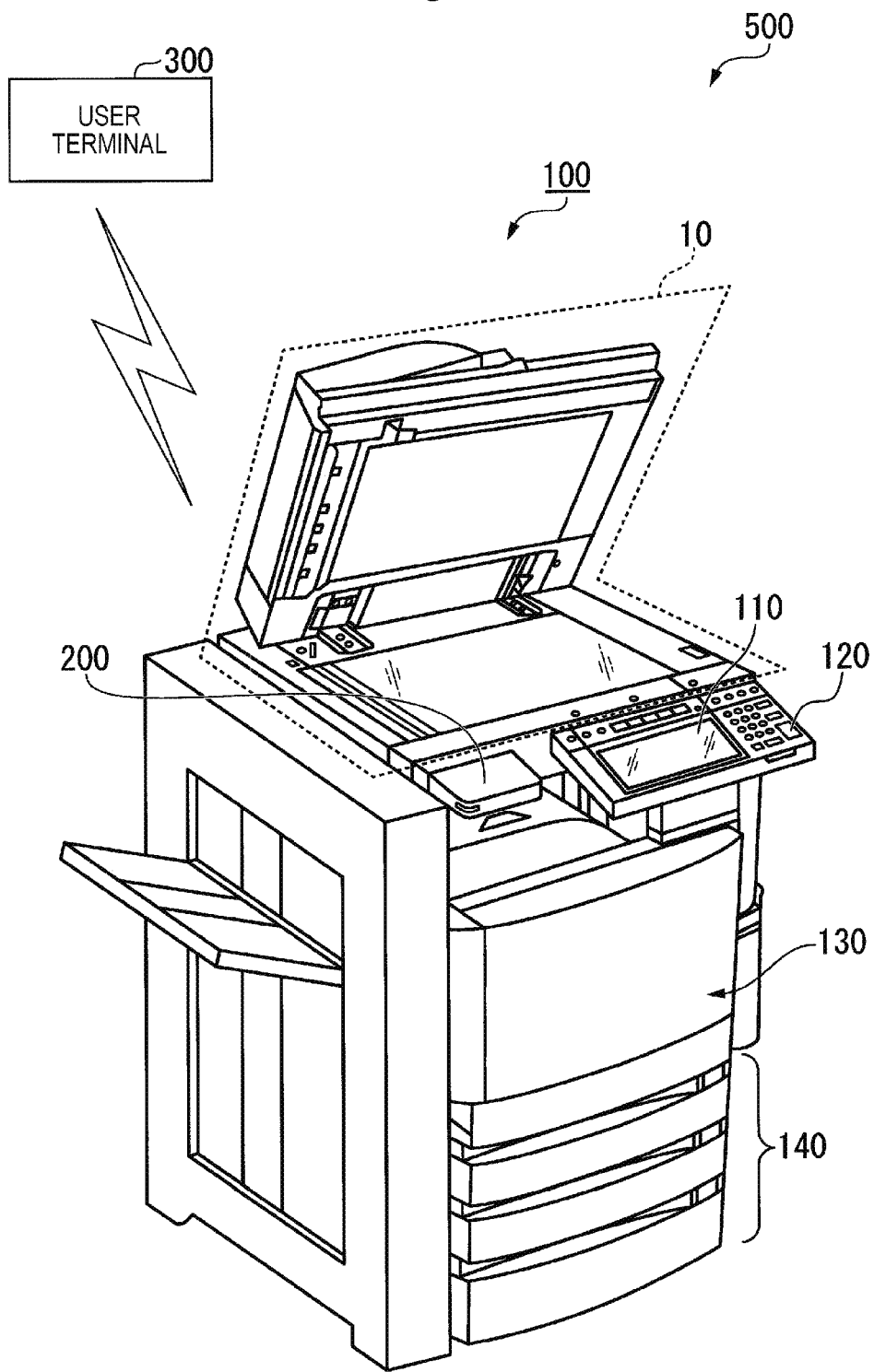
FIG. 1 is a diagram illustrating a configuration example of an image forming system according to an embodiment.

Hereinafter, an image forming apparatus and a control method according to certain example embodiments will be described with reference to the drawings. FIG. 1 is a diagram illustrating a configuration example of the image forming system 500 according to the embodiment. The image forming system 500 includes an image forming apparatus 100 and a user terminal 300. The image forming apparatus 100 is an apparatus that forms an image on a sheet. The image forming apparatus 100 is, for example, a multifunction peripheral (MFP). The user terminal 300 is an information processing apparatus that transmits an image forming request to the image forming apparatus 100. A communication device 200 of the image forming apparatus 100 and the user terminal 300 communicate via a wired connection or wirelessly (e.g., radio frequency communications). The user terminal 300 transmits various instructions to the image forming apparatus 100 via the communication device 200. For example, the user terminal 300 may transmit search data or a beacon. Specific examples of such search data and beacons include signals defined by Bluetooth™. The user terminal 300 may transmit an image forming instruction or an image reading instruction. Hereinafter, each device will be described in detail.

Figure 2:
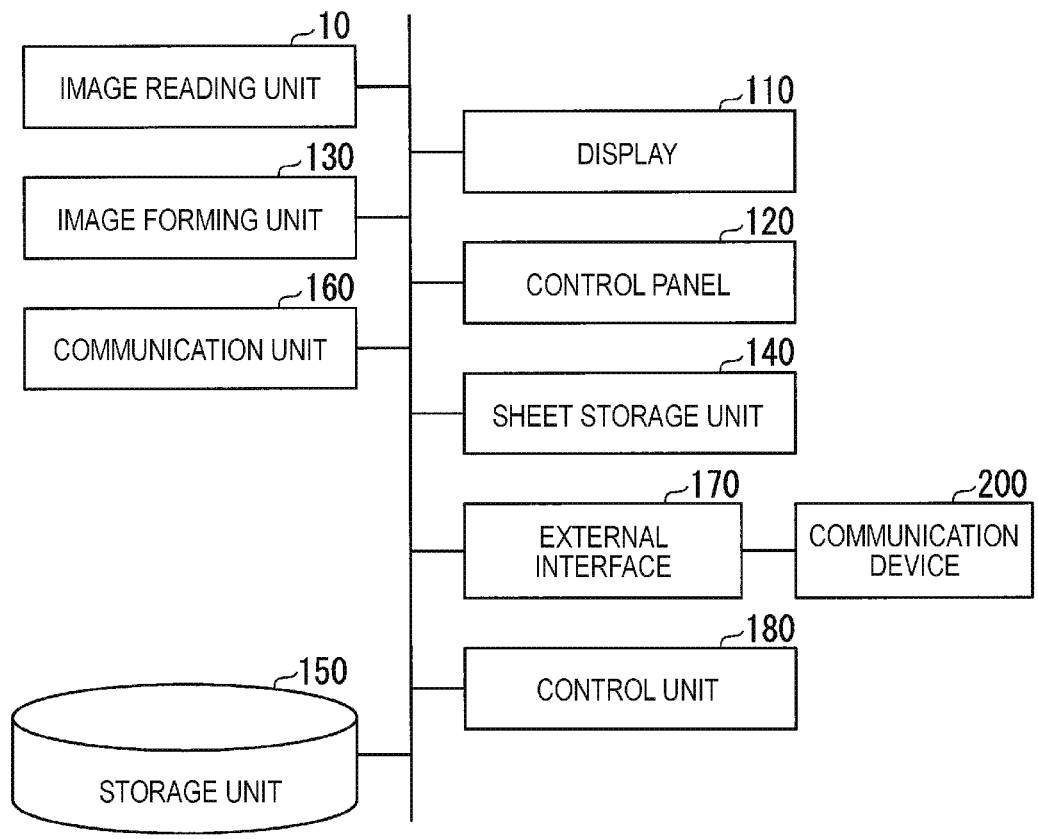
FIG. 2 is a block diagram of an image forming apparatus according to an embodiment.

FIG. 2 is a hardware block diagram of the image forming apparatus 100 according to the embodiment. First, the image forming apparatus 100 will be described in detail with reference to FIGS. 1 and 2. The image forming apparatus 100 includes an image reading unit 10, a display 110, a control panel 120, an image forming unit 130, a sheet storage unit 140, a storage unit 150, a communication unit 160, an external interface 170, and a control unit 180.

The image forming apparatus 100 forms an image on a sheet using a developer such as a toner or ink. When the developer is a toner, the developer is fixed on the sheet by heating. When the developer is ink, the developer is applied to the sheet to form an image on the sheet. The sheet is, for example, a sheet of paper or a label. The sheet may be any sheet as long as the image forming apparatus 100 can form an image on the surface thereof.

The image reading unit 10 is, for example, a scanner. The image reading unit 10 reads image information to be read based on brightness and darkness of light. The image reading unit 10 records the read image information. The recorded image information may be stored in the storage unit 150 of the image forming apparatus 100, or may be transmitted to another information processing apparatus via a network. The recorded image information may be image-formed on a sheet by the image forming unit 130.

The display 110 is an image display device such as a liquid crystal display and an organic electro-luminescence (EL) display. The display 110 displays various information related to the image forming apparatus 100.

The control panel 120 includes a plurality of buttons. The control panel 120 receives a user operation. The control panel 120 outputs a signal corresponding to an operation performed by the user to the control unit (the control unit 180 described later) of the image forming apparatus 100. The display 110 and the control panel 120 may be configured as an integrated touch panel.

The image forming unit 130 forms an image on a sheet based on the image information generated by the image reading unit 10 or the received image information. The image forming unit 130 includes, for example, a developing device, a transfer device, and a fixing device. A sheet conveyance path is formed in the image forming unit 130. The sheet to be processed is conveyed by rollers provided along the conveyance path. An image is formed on the sheet in the course of conveyance.

The image forming unit 130 forms an image by, for example, the following processing. The developing device of the image forming unit 130 forms an electrostatic latent image on a photosensitive drum based on the image information. The developing device of the image forming unit 130 forms a visible image by attaching a developer to the electrostatic latent image.

The transfer device of the image forming unit 130 transfers a visible image onto the sheet. The fixing device of the image forming unit 130 fixes a visible image on the sheet by heating and pressing the sheet. The sheet on which an image is formed may be a sheet stored in the sheet storage unit 140 or a manually fed sheet.

The sheet storage unit 140 stores sheets to be used for image formation in the image forming unit 130.

The storage unit 150 is configured using a storage device such as a magnetic hard disk device or a semiconductor storage device. The storage unit 150 stores data required when the image forming apparatus 100 operates. The storage unit 150 may temporarily store or save data of an image formed in the image forming apparatus 100.

The communication unit 160 is configured using a communication interface. The communication unit 160 communicates with another device (for example, an information terminal such as a personal computer) via a network such as a local area network (LAN).

The external interface 170 communicates with another device by being connected to an interface provided in the other device. The external interface 170 may be configured using a universal serial bus (USB), may be configured using a high-definition multimedia interface (HDMI™), or may be configured using another technology, for example. The image forming apparatus 100 and the communication device 200 are connected via the external interface 170.

The control unit 180 includes a processor, such as a central processing unit (CPU), and a memory. In some contexts, the control unit may be referred to as a controller 180. The control unit 180 reads and executes a program stored in the storage unit 150. The control unit 180 controls the operation of each device provided in the image forming apparatus 100. For example, upon receiving an image forming instruction from the communication device 200, the control unit 180 may control the image forming apparatus 100 to form an image on a sheet according to the received instruction. For example, upon receiving an image reading instruction from the communication device 200, the control unit 180 may control the image forming apparatus 100 to transmit the data of the image read by the image reading unit 10 to the communication device 200 that is the transmission source of the instruction.

The image forming apparatus 100 includes, as control states, at least a first power saving state, a second power saving state, and a normal state. In the first power saving state, at least the image forming unit 130 and the control unit 180 are controlled to be not activated, and the communication device 200 is controlled to be activated. As a specific example of the first power saving state, there is a so-called 'deep sleep'.

In the second power saving state, at least the image reading unit 10 and/or the image forming unit 130 are controlled to be not activated, and the communication device 200 and the control unit 180 are controlled to be activated. Specific examples of the second power saving state include a power saving mode and a standby mode of a general image forming apparatus.

In the normal state, at least the image reading unit 10 and/or the image forming unit 130, the control unit 180, and the communication device 200 are controlled to be activated. As a specific example of the normal state, there is a state in which image formation is possible in a general image forming apparatus.

Next, image formation in the image forming apparatus 100 will be described. There are at least two types of image forming processes executed by the image forming apparatus 100. Those two types of image forming processes are sequential image formation and occasional image formation. The sequential image formation is a specific example of a sequential operation. The sequential image formation is image formation that is scheduled to be executed immediately. An example of sequential image formation is a process in which image data or document data to be image-formed and instruction data are transmitted to the image forming apparatus 100, and the image formation is immediately executed by the image forming apparatus 100 and the sheet is output to a discharge tray. For example, a so-called general print instruction is an instruction for sequential image formation.

The occasional image formation is image formation that is not scheduled to be executed immediately upon receipt of a job. An example of occasional image formation is a process in which image data or document data to be image-formed and instruction data are transmitted to the image forming apparatus 100, but the image formation is not executed until an execution condition is satisfied, and the execution of the image formation is on standby. As a specific example of the execution condition, for example, there is a condition that the user who transmits the instruction data instructs the execution of image formation on the control panel 120 of the image forming apparatus 100. As a specific example of the execution condition, for example, there is a condition that a wireless signal including the user ID of the user who transmits the instruction data is received by the image forming apparatus 100. The execution condition may be designed as another condition rather than receipt of a user ID.

Next, image reading in the image forming apparatus 100 will be described. There are at least two types of image reading processes executed in the image forming apparatus 100. These two types of image reading processes are sequential image reading and occasional image reading. The sequential image reading is a specific example of the sequential operation. The sequential image reading is image reading that is scheduled to be executed immediately. An example of a sequential image reading process is a process in which a sheet to be read is set in the image reading unit 10 of the image forming apparatus 100, the instruction data is transmitted to the image forming apparatus 100, and the image reading is immediately executed in the image forming apparatus 100. In this case, the read image may be recorded in the storage unit 150 of the image forming apparatus 100, or may be transmitted to another device via the communication unit 160 or the communication device 200. For example, a so-called general image reading instruction is an instruction for performing the sequential image reading process.

The occasional image reading is image reading in which the execution of image reading is not scheduled. An example of an occasional image reading process is a process of transmitting image data already stored in the storage unit 150 of the image forming apparatus 100 to the communication apparatus 200 or another designated information processing apparatus. In addition, any process that does not operate the image reading unit 10 immediately may be defined as an occasional image reading process.

Figure 3:
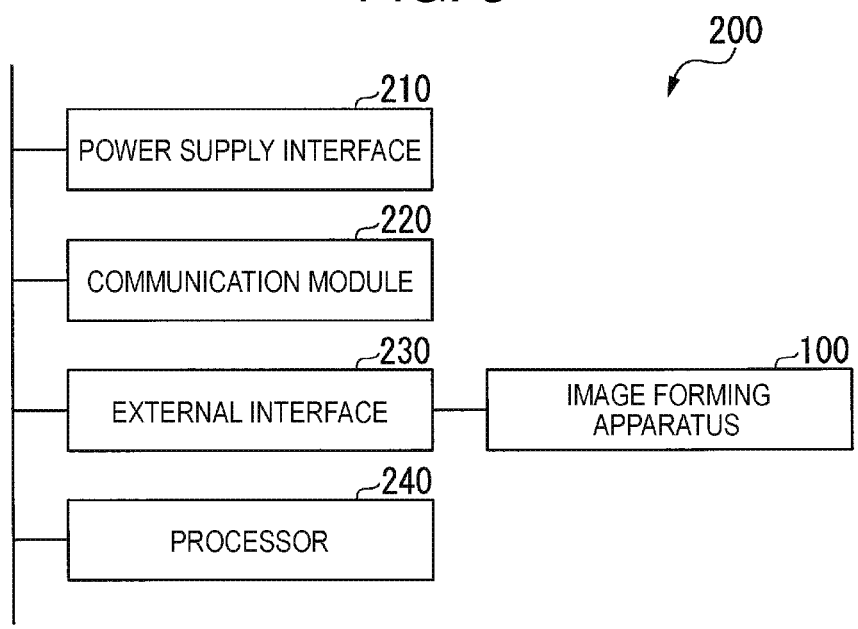
FIG. 3 is a block diagram of a communication device.

FIG. 3 is a hardware block diagram of the communication device 200. Next, the details of the communication device 200 will be described. The communication device 200 includes a power supply interface 210, a communication module 220, an external interface 230, and a processor 240.

The power supply interface 210 supplies power to a component of the image forming apparatus 100 (e.g., the communication device 200) by being connected to a power supply. For example, the power supply interface 210 supplies power to the communication module 220 and the processor 240 of the image forming apparatus 100 (e.g., the communication device 200). The power supply to which the power supply interface 210 is connected is a power supply capable of supplying power even when the image forming apparatus 100 is in the first power saving state or the second power saving state. Therefore, even when the image forming apparatus 100 is in the first power saving state or the second power saving state, the communication device 200 can receive power and operate.

The communication module 220 is a module that communicates with another device. The communication module 220 may be, for example, a wireless communication module or a wired communication module. For example, if the communication module 220 is configured as a wireless communication module, communication using Bluetooth™ may be performed. For example, if the communication module 220 is configured as a wired communication module, communication using a Universal Serial Bus (USB) may be performed.

The communication module 220 is configured using a communication interface. The communication unit 160 communicates with another device (for example, an information terminal such as a personal computer) via a network such as a local area network (LAN).

The external interface 230 communicates with another device by being connected to an interface provided in another device. The external interface 170 may be configured using USB, may be configured using HDMI™, or may be configured using another technology, for example. The image forming apparatus 100 and the communication device 200 are connected via the external interface 230.

The processor 240 is a processor such as a CPU. The processor 240 operates according to the data received via the communication module 220. If data of a first communication, which is a predetermined type of communication, is received, the processor 240 responds to the data of the first communication. On the other hand, if data of a second communication, which is a communication of a type different from the first communication, is received, the processor 240 does not respond to the data of the second communication. Instead, the processor 240 outputs an activation signal, which is a signal for activating the control unit 180 of the image forming apparatus 100, via the external interface 230. The control unit 180 of the image forming apparatus 100 is activated in response to receiving the activation signal. The activation signal may include a signal instructing to operate in the second power saving state after activation. The activation signal may include a signal instructing to operate in a normal state after activation.

Figure 4:
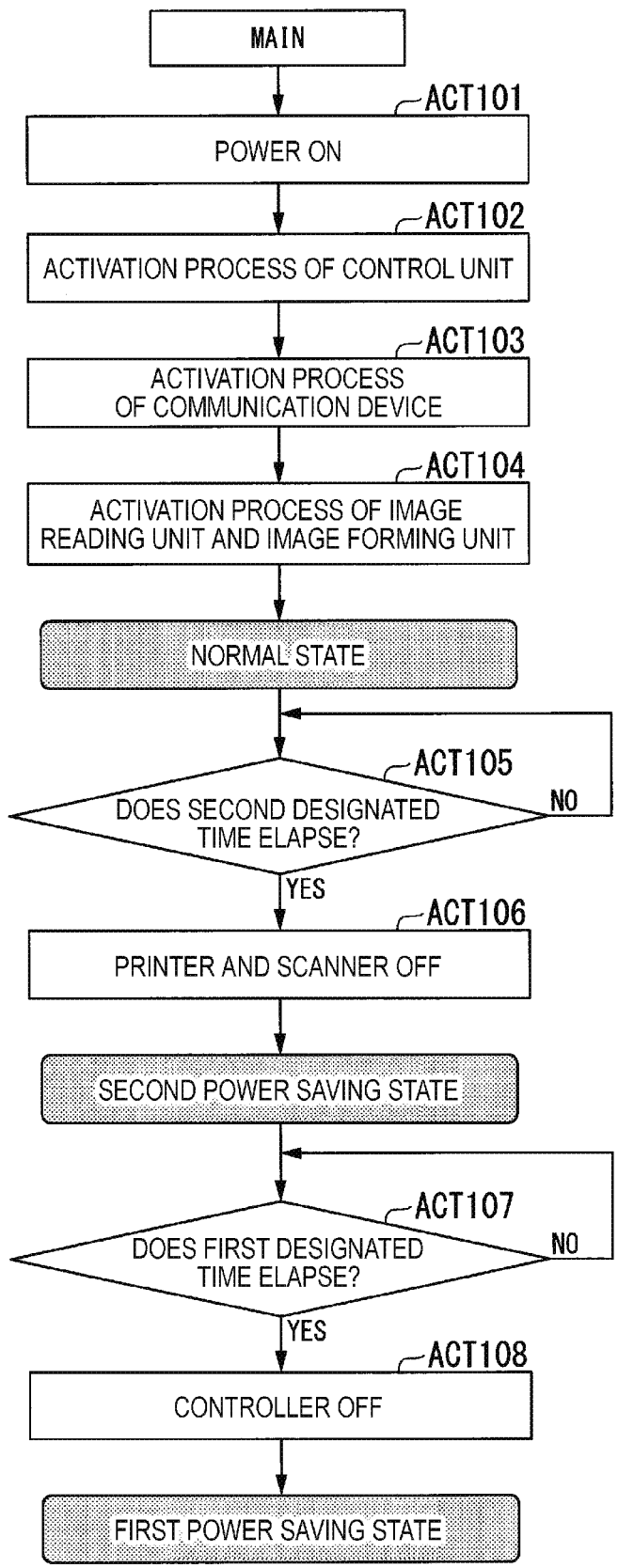
FIG. 4 is a flowchart illustrating aspects of an overall operation of an image forming system.

FIG. 4 is a flowchart illustrating a specific example of the flow of the entire operation of the image forming system 500. First, when the power of the image forming apparatus 100 is turned on (ACT 101), the control unit 180 is activated (ACT 102). After that, an activation signal is output from the control unit 180, and the communication device 200 is activated according to the activation signal (ACT 103). Further, the control unit 180 activates the image reading unit 10 and the image forming unit 130 (ACT 104). Thereafter, the control unit 180 controls the image forming apparatus 100 in the normal state.

After that, until a predetermined designated time (referred to as the "second state designated time" or "second designated time") elapses without performance of a predetermined operation (NO in ACT 105), the control unit 180 controls the image forming apparatus 100 to be in the normal state. On the other hand, if the second state designated time elapses without performance of the predetermined operation (YES in ACT 105), the control unit 180 controls the image forming apparatus 100 to be in the second power saving state. For example, the control unit 180 turns off the image reading unit 10 and the image forming unit 130 (ACT 106). With such control, the image forming apparatus 100 enters the second power saving state. The predetermined operation is, for example, an operation on the control panel 120 or an operation for receiving an image forming instruction via a network.

After that, until a predetermined designated time (referred to as a "first state designated time" or a "first designated time") elapses without performance of a predetermined operation (NO in ACT 107), the control unit 180 controls the image forming apparatus 100 to be in the second power saving state. On the other hand, if the first designated time elapses without performing the predetermined operation (YES in ACT 107), the control unit 180 controls the image forming apparatus 100 to be in the first power saving state. For example, the control unit 180 turns off the control unit 180 (ACT 108). With such control, the image forming apparatus 100 enters the first power saving state. In the first power saving state, more power consumption can be saved than in the second power saving state.

Figure 5:
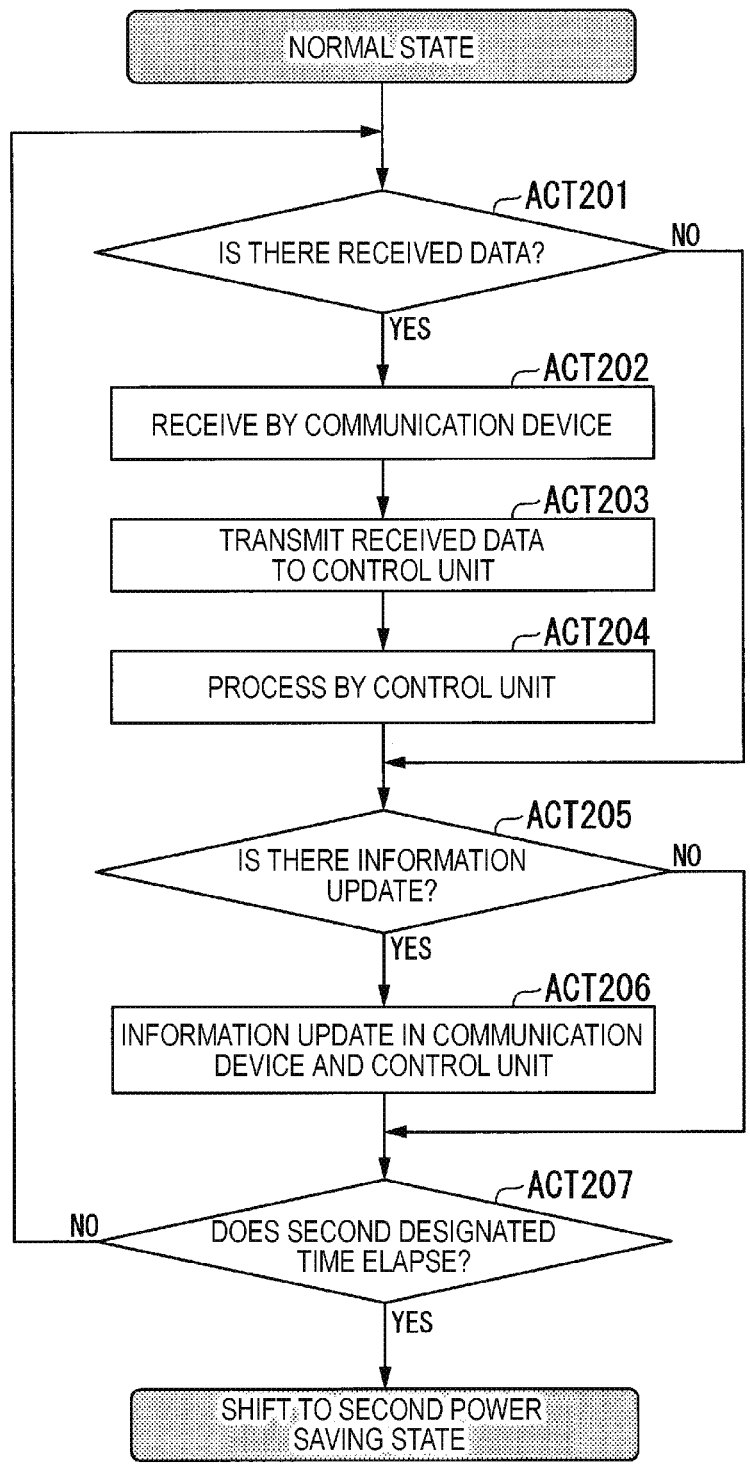
FIG. 5 is a flowchart illustrating processing in a normal state.

FIG. 5 is a flowchart illustrating a specific example of the processing in the normal state. When data is transmitted to the communication device 200 (YES in ACT 201), the communication device 200 receives the data (ACT 202). The communication device 200 transmits the received data to the control unit 180 (ACT 203). After that, the control unit 180 performs a process based on the received data (ACT 204). The process at this time includes an image forming process and an image reading process. If there is a change (information update) in the process performed by the communication device 200 in the first power saving state (YES in ACT 205), the processor 240 of the communication device 200 records the updated information in the storage device (ACT 206). The control unit 180 of the image forming apparatus 100 also records the updated information in the storage unit 150. Thereafter, when a predetermined second designated time elapses without performing a predetermined operation (YES in ACT 207), the control unit 180 controls the image forming apparatus 100 to be in the second power saving state.

Figure 6:
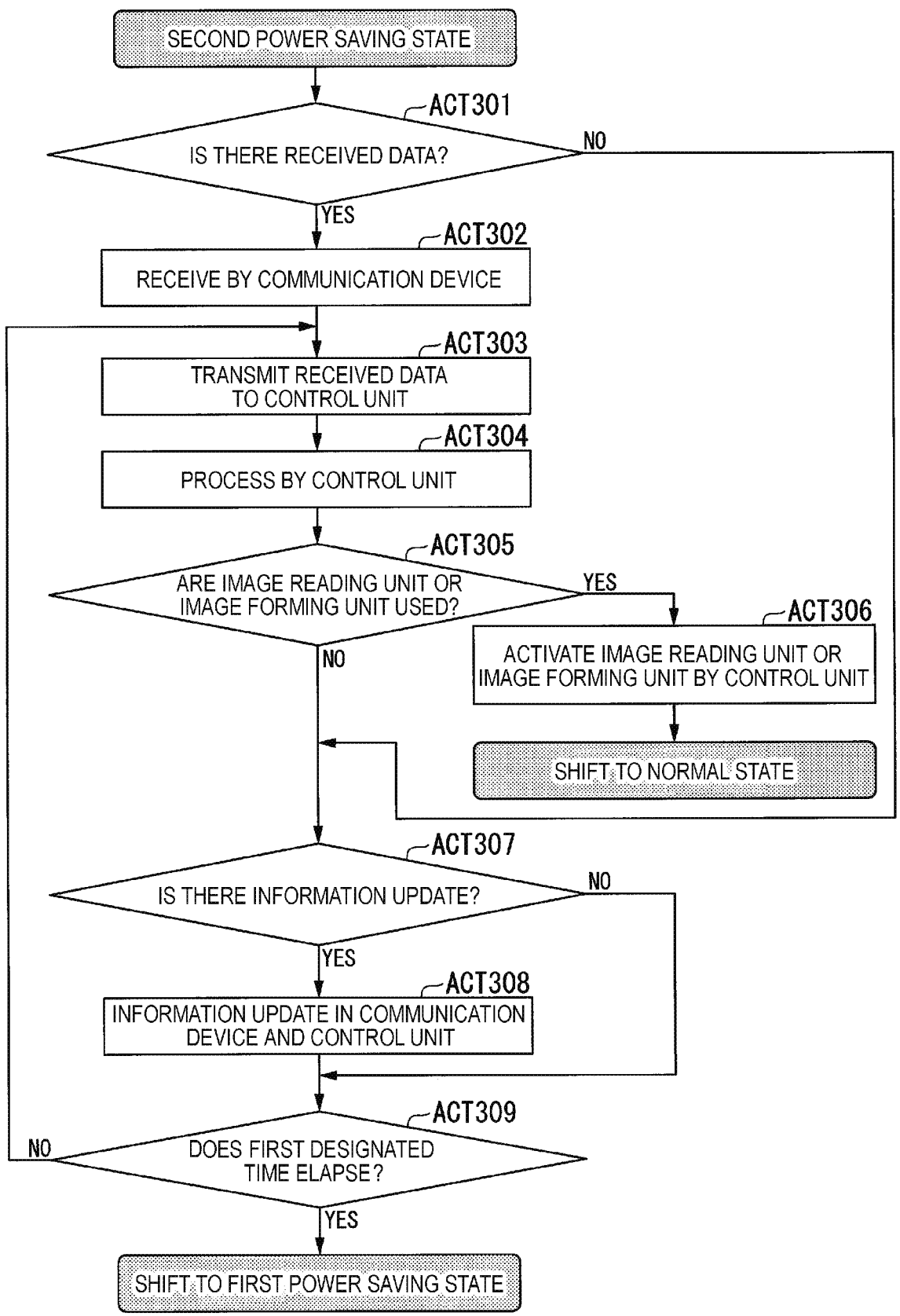
FIG. 6 is a flowchart illustrating processing in a second power saving state.

FIG. 6 is a flowchart illustrating a specific example of the processing in the second power saving state. When data is transmitted to the communication device 200 (YES in ACT 301), the communication device 200 receives the data (ACT 302). The communication device 200 transmits the received data to the control unit 180 (ACT 303). After that, the control unit 180 performs a process based on the received data (ACT 304). If the process to be executed includes a process using the image reading unit 10 or the image forming unit 130 (YES in ACT 305), the control unit 180 activates devices to be used (the image reading unit 10 or the image forming unit 130) (ACT 306). As a result, the image forming apparatus 100 shifts to the normal state.

If the process to be executed does not include any of the processes using the image reading unit 10 and the process using the image forming unit 130 (NO in ACT 305), the control unit 180 does not activate the image reading unit 10 and the image forming unit 130. As a result, the image forming apparatus 100 remains in the second power saving state. If there is a change (information update) in the process performed by the communication device 200 in the first power saving state (YES in ACT 307), the processor 240 of the communication device 200 records the updated information in the storage device (ACT 308). The control unit 180 of the image forming apparatus 100 also records the updated information in the storage unit 150. Thereafter, when a predetermined first designated time elapses without performing a predetermined operation (YES in ACT 309), the control unit 180 controls the image forming apparatus 100 to be in the first power saving state.

Figure 7:
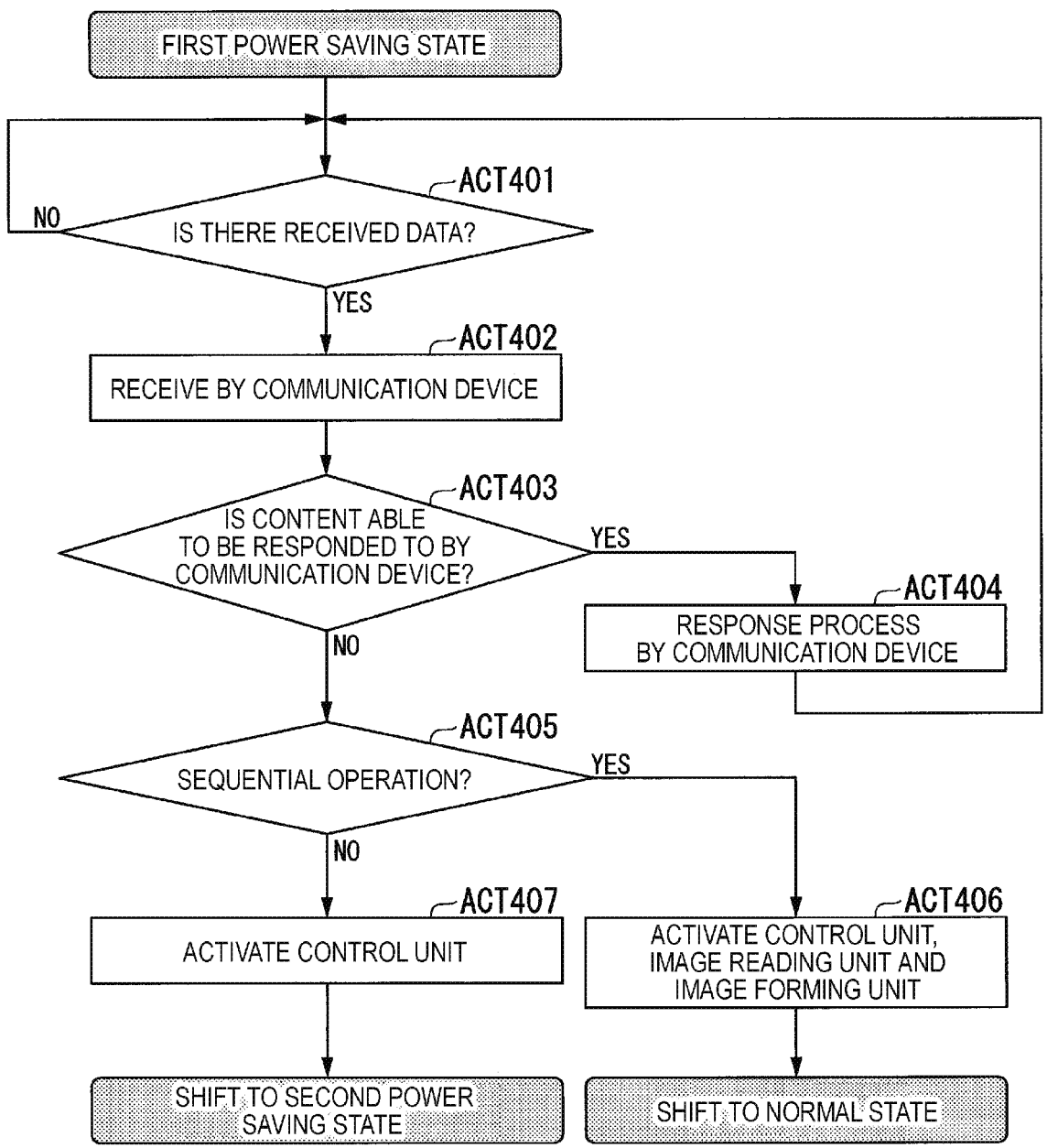
FIG. 7 is a flowchart illustrating processing in a first power saving state.

FIG. 7 is a flowchart illustrating a specific example of the processing in the first power saving state. When data is transmitted to the communication device 200 (YES in ACT 401), the communication device 200 receives the data (ACT 402). If the received data is content that can be responded to by the communication device 200 (YES in ACT 403), the processor 240 of the communication device 200 performs a response process (ACT 404).

Specific examples of content that can be responded to by the communication device 200 include a stored pattern of search data and a beacon. When the content of the search is content in which the response content is stored in the communication device 200 in advance (hereinafter, referred to as a "stored pattern"), the communication device 200 can respond. Since the response content of the beacon can be known in advance, the communication device 200 can respond according to the response content stored in advance.

If the received data is not content that can be responded to by the communication device 200 (NO in ACT 403), the processor 240 determines whether or not the process instructed by the received data is a sequential operation (ACT 405). If the process instructed by the received data is a sequential operation (YES in ACT 405), the processor 240 activates the control unit 180, the image reading unit 10, and the image forming unit 130 of the image forming apparatus 100 (ACT 406). As a result, the image forming apparatus 100 shifts to the normal state. If the process instructed by the received data is not a sequential operation (NO in ACT 405), the processor 240 activates the control unit 180 of the image forming apparatus 100 (ACT 407). As a result, the image forming apparatus 100 shifts to the second power saving state.

FIG. 8 is a flowchart illustrating a specific example of the processing of the communication device 200. When a search response of a stored pattern (YES in ACT 501, YES in ACT 502) is received, the communication device 200 responds with a predetermined response content (ACT 504). The communication device 200 also responds with a predetermined response content (ACT 504) when a beacon is received (NO in ACT 501, YES in ACT 503).

On the other hand, when a search response that is not a stored pattern is received (YES in ACT 501, NO in ACT 502), the communication device 200 activates the control unit 180 of the image forming apparatus 100 (ACT 505). As a result, the image forming apparatus 100 shifts to the second power saving state.

Further, when the communication device 200 receives data that is neither a search response nor a beacon (NO in ACT 501, NO in ACT 503), the communication device 200 determines whether or not the data is from the image forming apparatus 100 to which the own device is connected (hereinafter simply referred to as the "own device source") (ACT 506). If the data is not from the own device source (NO in ACT 506), the process for the received data is terminated. On the other hand, if the data is from the own device source (YES in ACT 506), it is determined whether or not the transmission source of the received data is a trusted connection destination (ACT 507). The trusted connection destination is, for example, a device registered in the communication device 200 in advance as a connection destination. A specific example of such a trusted connection destination includes a Bluetooth-paired device. If the connection destination cannot be trusted (NO in ACT 507), the processor 240 activates the control unit 180 of the image forming apparatus 100 (ACT 505). As a result, the image forming apparatus 100 shifts to the second power saving state.

On the other hand, if the connection destination can be trusted, the processor 240 determines whether or not the process instructed by the received data is a sequential operation (ACT 508). If the process instructed by the received data is a sequential operation (YES in ACT 508), the processor 240 activates the control unit 180, the image reading unit 10, and the image forming unit 130 of the image forming apparatus 100 (ACT 509). As a result, the image forming apparatus 100 shifts to the normal state. If the process instructed by the received data is not a sequential operation (NO in ACT 508), the processor 240 activates the control unit 180 of the image forming apparatus 100 (ACT 505). As a result, the image forming apparatus 100 shifts to the second power saving state.

The image forming system 500 configured as described above is controlled in at least three states of the first power saving state, the second power saving state that consumes more power than the first power saving state but consumes less power than the normal state, and the normal state. Therefore, the power consumption of the image forming apparatus 100 can be further reduced as compared to conventional power saving methods. For example, the power consumption can be further reduced as compared with the case where the control is performed for only two states (that is, the first power saving state and the normal state) since the image forming system. 500 can additionally use the second power saving state, and as a result, it is possible to suppress the power consumption even greater than in a case having only one power saving state.

Further, in the image forming system 500, different control is performed according to the type of image formation even once an image forming instruction is received. That is, when an instruction to execute a sequential image formation is received, the state of the image forming apparatus 100 is controlled to operate in the normal state, but when an instruction to execute an occasional image formation is received, the state of the image forming apparatus 100 is controlled to operate in the second power saving state. As described above, even after an image forming instruction is received, the image forming apparatus does not always enter the normal state, but rather is controlled to operate in the second power saving state with lower power consumption when performing the occasional image formation. Therefore, even when an image forming instruction is received, power consumption can be further reduced by performing different control according to the type of image formation being instructed/requested.

Further, in the image forming system 500, different control is performed after receiving an image reading instruction according to the type of image that is being instructed. That is, when an instruction to execute sequential image reading is received, the device is controlled to operate in the normal state, but when an instruction to execute an occasional image reading is received, the device is controlled to operate in the second power saving state. As described above, even after an image reading instruction is received, the image forming apparatus does not always enter the normal state, but rather is controlled to operate in the second power saving state with lower power consumption when performing the occasional image reading instead of the sequential reading. Therefore, even when an image reading instruction is received, power consumption can be further reduced by performing different control according to the type of image reading instructed/requested.

(Modification)

In some examples, the control unit 180 of the image forming apparatus 100 may perform the control such that the image reading unit 10 and the image forming unit 130 are always activated when the image forming apparatus 100 is controlled to be in the normal state. When the image forming apparatus 100 is controlled to be in the normal state, the control unit 180 may perform the control such that only the devices/components that need to operate are activated. For example, when a sequential image forming instruction is input but a sequential image reading instruction is not input, the control unit 180 may perform the control to activate the image forming unit 130 but not activate the image reading unit 10. For example, when a sequential image reading instruction is input but a sequential image forming instruction is not input, the control unit 180 may perform the control to activate the image reading unit 10 but not activate the image forming unit 130. Further, when a sequential image forming instruction and a sequential image reading are input, the control unit 180 may perform the control to activate both the image forming unit 130 and the image reading unit 10.

While certain embodiments have been described, these embodiments have been presented by way of example only, and are not intended to limit the scope of the inventions as described herein. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions as described herein.

What is claimed is:

1. An image forming apparatus comprising:
an image forming unit configured to form an image on a sheet using a developing material;
an image reading unit configured to read an image on a sheet;
a communication device configured to communicate with a second device and including a processor configured to control communication with the second device; and
a controller configured to control the image forming apparatus to operate in a first power saving state, a second power saving state, and a normal state, wherein
in the first power saving state, the image forming unit, the image reading unit and the controller are not activated, and the communication device is activated,
in the second power saving state, at least one of the image forming unit and the image reading unit are not activated, and the communication device and the controller are activated, and
in the normal state, the image forming unit, the image reading unit, the communication device, and the controller are activated, wherein
the processor of the communication device is configured to:
respond to the second device when receiving data of a first communication type, and
output an activation signal to activate the controller when receiving data of a second communication type that is different from the first communication type, and
the controller is configured to control the image forming apparatus to be in one of the second power saving state or the normal state upon receiving the activation signal.

2. The apparatus according to claim 1, wherein
when the image forming apparatus is in the second power saving state and instruction data is received by the communication device that includes an instruction to perform sequential image formation, the controller is configured to shift the image forming apparatus from the second power saving state to the normal state.

3. The apparatus according to claim 1, wherein
when the image forming apparatus is in the second power saving state and instruction data is received by the communication device that includes an instruction to execute occasional image formation, the controller is configured to keep the image forming apparatus in the second power saving state without shifting to the normal state.

4. The apparatus according to claim 1, further comprising:
a storage unit configured to store data, wherein
data corresponding to the first communication type comprises data that matches the data stored in the storage unit.

5. The apparatus according to claim 4, wherein when data corresponding to the first communication type does not match any of the data stored in the storage unit, the controller controls the image forming apparatus to be in the second power saving state.

6. The apparatus according to claim 1, further comprising:
a control panel including a plurality of buttons configured to accept user input, wherein
the controller is configured to control the image forming apparatus to be in the normal state after one of the plurality of buttons is operated.

7. A control method for an image forming apparatus, including an image forming unit configured to form an image on a sheet using a developing material, an image reading unit configured to read an image on a sheet, a communication device configured to communicate with a second device and including a processor configured to control the communication with the second device, and a controller configured to control the image forming apparatus to operate in a first power saving state, a second power saving state, and a normal state, the control method comprising:
controlling the image forming apparatus such that, when in the first power saving state, the image forming unit, the image reading unit and the controller are not activated, and the communication device is activated;

controlling the image forming apparatus such that, when in the second power saving state, at least one of the image forming unit and the image reading unit are not activated and the communication device and the controller are activated;

controlling the image forming apparatus such that, when in the normal state, the image forming unit, the image reading unit, the communication device, and the controller are activated; and comparing content of a communication received by the communication device to a stored pattern and having the communication device respond to the communication from the second device if the content of the communication matches the stored pattern.

8. The control method according to claim 7, further comprising:

controlling the image forming apparatus such that, when the image forming apparatus is in the second power saving state and instruction data is received by the communication device that includes an instruction to perform sequential image formation, the image forming apparatus is shifted from the second power saving state to the normal state.

9. The control method of claim 7, further comprising:

controlling the image forming apparatus such that, when the image forming apparatus is in the second power saving state and instruction data is received that includes an instruction to execute occasional image formation, the image forming apparatus is maintained in the second power saving state without shifting to the normal state.

10. The control method according to claim 7, wherein, when in the second power saving state, both the image forming unit and the image reading unit are not activated.

11. The control method according to claim 7, wherein, when the content of the communication does not match the stored pattern, the image forming apparatus is controlled to be in the second power saving state.

12. The control method according to claim 7, further comprising:

receiving an indication of a user actuating one of a plurality of buttons of a control panel of the image forming apparatus; and controlling the image forming apparatus to be in the normal state after receiving the indication.

13. An image forming apparatus comprising:

an image forming unit configured to form an image on a sheet using a developing material;

an image reading unit configured to read an image on a sheet;

a communication device configured to communicate with a second device and including a processor configured to control communication with the second device; and a controller configured to control the image forming apparatus to operate in a first power saving state, a second power saving state, and a normal state, wherein in the first power saving state, the image forming unit, the image reading unit and the controller are not activated, and the communication device is activated, in the second power saving state, at least one of the image forming unit and the image reading unit are not activated, and the communication device and the controller are activated, and in the normal state, the image forming unit, the image reading unit, the communication device, and the controller are activated, wherein when the image forming apparatus is in the second power saving state and instruction data is received by the communication device that includes an instruction to execute occasional image formation, the controller is configured to keep the image forming apparatus in the second power saving state without shifting to the normal state.

14. The apparatus according to claim 13, wherein when the image forming apparatus in the second power saving state and instruction data is received by the communication device that includes an instruction to perform sequential image formation, the controller is configured to shift the image forming apparatus from the second power saving state to the normal state.

15. The apparatus according to claim 13, further comprising:

a control panel including a plurality of buttons configured to accept user input, wherein the controller is configured to control the image forming apparatus to be in the normal state after one of the plurality of buttons is operated.

16. A control method for an image forming apparatus, including an image forming unit configured to form an image on a sheet using a developing material, an image reading unit configured to read an image on a sheet, a communication device configured to communicate with a second device and including a processor configured to control the communication with the second device, and a controller configured to control the image forming apparatus to operate in a first power saving state, a second power saving state, and a normal state, the control method comprising:

controlling the image forming apparatus such that, when in the first power saving state, the image forming unit, the image reading unit and the controller are not activated, and the communication device is activated;

controlling the image forming apparatus such that, when in the second power saving state, at least one of the image forming unit and the image reading unit are not activated and the communication device and the controller are activated;

controlling the image forming apparatus such that, when in the normal state, the image forming unit, the image reading unit, the communication device, and the controller are activated; and controlling the image forming apparatus such that, when the image forming apparatus is in the second power saving state and instruction data is received that includes an instruction to execute occasional image formation, the image forming apparatus is maintained in the second power saving state without shifting to the normal state.

17. The control method according to claim 16, further comprising:

controlling the image forming apparatus such that, when the image forming apparatus is in the second power saving state and instruction data is received by the communication device that includes an instruction to perform sequential image formation, the image forming apparatus is shifted from the second power saving state to the normal state.

* * * * *